(12) United States Patent
Gunnarsson et al.

(10) Patent No.: US 7,577,456 B2
(45) Date of Patent: Aug. 18, 2009

(54) USING UPLINK RELATIVE PATH GAIN RELATED MEASUREMENTS TO SUPPORT UPLINK RESOURCE MANAGEMENT

(75) Inventors: Fredrik Gunnarsson, Linköping (SE); Erik Geijer-Lundin, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 561 days.

(21) Appl. No.: 11/066,558

(22) Filed: Feb. 28, 2005

(65) Prior Publication Data
US 2006/0194546 A1   Aug. 31, 2006

(51) Int. Cl.
H04B 17/00 (2006.01)
H04B 7/00 (2006.01)
H04B 7/185 (2006.01)

(52) U.S. Cl. ............. 455/522; 455/67.11; 455/67.13; 370/318

(58) Field of Classification Search ............ 455/69, 455/67.11, 560, 67.13, 114.2, 245.1, 250.1, 455/278, 522; 370/321, 328, 318
See application file for complete search history.

(56) References Cited

U.S. PATENT DOCUMENTS

| | | | | |
|---|---|---|---|---|
| 5,574,974 | A * | 11/1996 | Almgren et al. | 455/450 |
| 6,157,616 | A * | 12/2000 | Whitehead | 370/252 |
| 6,334,047 | B1 * | 12/2001 | Andersson et al. | 455/69 |
| 6,741,862 | B2 * | 5/2004 | Chung et al. | 455/452.1 |
| 6,760,596 | B1 * | 7/2004 | Fiorini et al. | 455/522 |
| 6,813,510 | B1 * | 11/2004 | Kunzinger | 455/562.1 |
| 6,990,428 | B1 * | 1/2006 | Kaiser et al. | 702/150 |
| 7,239,619 | B2 * | 7/2007 | Tobe et al. | 370/331 |
| 7,428,264 | B2 * | 9/2008 | Yano et al. | 375/225 |
| 2002/0119797 | A1 * | 8/2002 | Woodhead et al. | 455/522 |
| 2002/0160767 | A1 * | 10/2002 | Hanly | 455/422 |
| 2003/0193907 | A1 | 10/2003 | Rezaiifar et al. | |
| 2004/0022207 | A1 * | 2/2004 | Leung et al. | 370/321 |
| 2004/0109424 | A1 | 6/2004 | Chheda | |
| 2004/0110524 | A1 * | 6/2004 | Takano et al. | 455/522 |
| 2004/0209624 | A1 | 10/2004 | Rune et al. | |
| 2005/0043062 | A1 * | 2/2005 | Ahn et al. | 455/560 |
| 2006/0148414 | A1 * | 7/2006 | Tee et al. | 455/69 |

OTHER PUBLICATIONS

International Search Report for International Application No. PCT/SE2006/050010 dated Jun. 2, 2006.
Lundin et al; "Uplink Load Estimation in WCDMA", Report No. LiTH-ISY-R-2458, Automatic Control Communication Systems, Mar. 25, 2002.
Gunnarsson et al; "Uplink Admission Control in WCDMA Based on Relative Load Estimates", Report No. LiTH-ISY-R-2414, Automatic Control Communication Systems, Feb. 22, 2002.
Related U.S. Appl. No. 12/192,643, filed Aug. 15, 2008, Inventor: Helmersson et al.

* cited by examiner

*Primary Examiner*—Nay A Maung
*Assistant Examiner*—Andrew Wendell
(74) *Attorney, Agent, or Firm*—Nixon & Vanderhye P.C.

(57) ABSTRACT

A cellular system includes a first cell associated with a first base station, a second cell associated with a second base station, and a mobile radio currently served by the first base station. Distributed resource control may be used in which the first base station alone or in combination with the mobile station makes resource management decisions without having to involve a central controller. In ad-hoc networking, access points can manage resources in a distributed fashion. Relative path gain is determined for an uplink signal from the mobile radio. Relative path gain is based on a comparison of a first path gain related quantity for a mobile uplink signal to the second base station with a second path gain related quantity for the mobile uplink signal to the second base station. Uplink resources in the first cell are managed based on the relative path gain related quantity.

18 Claims, 4 Drawing Sheets

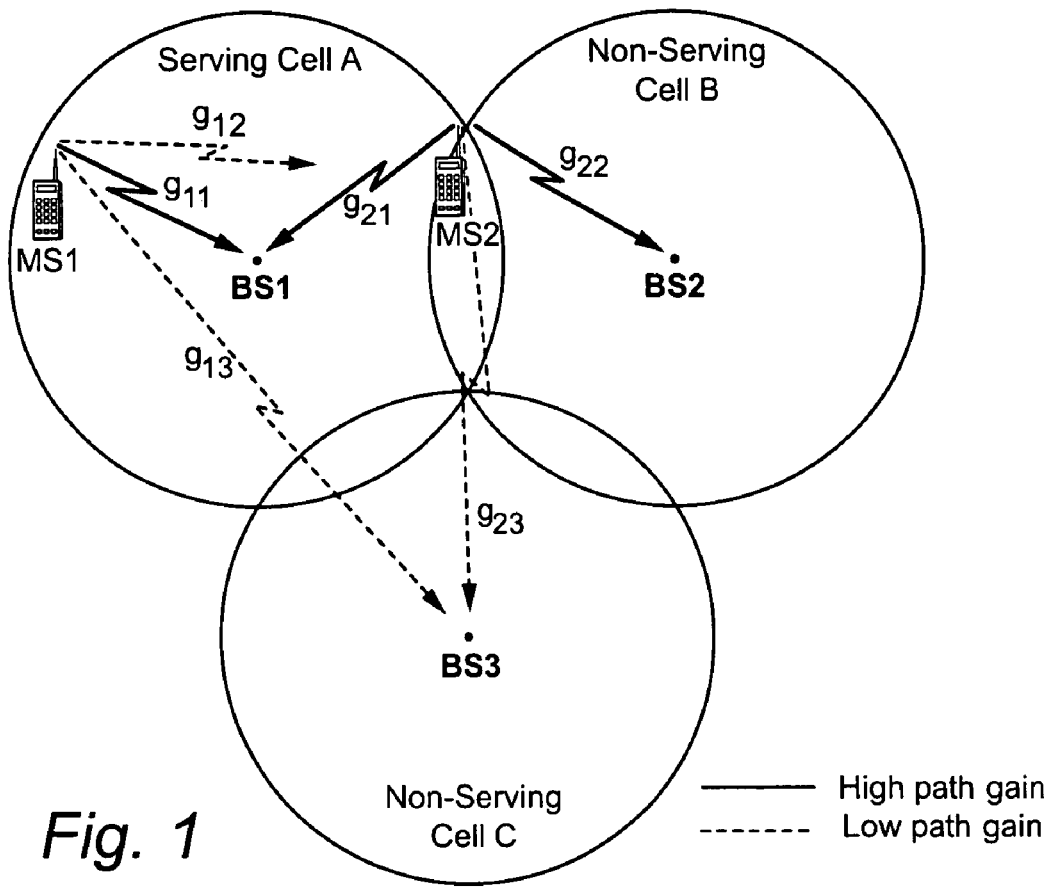

Fig. 1

— High path gain
------- Low path gain

```
┌─────────────────────────────────────────────┐
│ Determine a relative path gain for uplink   │
│ signal transmissions from the mobile radio, │─ S1
│ e.g., maximum path gain for a non-serving   │
│ BS/path gain for the serving BS.            │
└─────────────────────────────────────────────┘
                       │
                       ▼
┌─────────────────────────────────────────────┐
│ Average relative path gain (optional).      │─ S2
└─────────────────────────────────────────────┘
                       │
                       ▼
┌─────────────────────────────────────────────┐
│ Manage uplink resources using relative      │
│ path gain in a distributed uplink resource  │─ S3
│ management configuration.                   │
└─────────────────────────────────────────────┘
```

Fig. 2

— higher data rate
······ lower data rate

USING UPLINK RELATIVE PATH GAIN RELATED MEASUREMENTS TO SUPPORT UPLINK RESOURCE MANAGEMENT

RELATED APPLICATION

This application is related to commonly-assigned U.S. patent application Ser. No. 10/419,270, entitled "Uplink Load Determination And Signaling For Admission And Congestion Control," filed on Apr. 21, 2003, now U.S. Pat. No. 7,146,175, the disclosure of which is incorporated here by reference.

TECHNICAL FIELD

The technical field relates to radio communications systems, and more particularly, to resource management and/or load control.

BACKGROUND AND SUMMARY

In cellular radio communications, admission and congestion control, as well as resource control and allocation, for each cell are used to maintain acceptable quality of service for existing mobile user connections in those cells. And because radio resources are limited, they must be managed efficiently to maximize system capacity. For ease of description, load control, admission control, congestion control, and resource control and reallocation are generally referred to as resource management.

Admitting too many new connections may result in increased interference between the mobile user connections thereby degrading the quality of service. Transmitting at too high of a power level or bit rate in either the downlink or the uplink direction creates unnecessary interference which adversely impacts service quality and throughput. For downlink resource management, it is possible to estimate a worst case situation at every position in the service area by assuming that each base station is operating at maximum power. Such a situation may occur in cells that use high speed downlink shared channel transmission.

In the uplink direction from mobile to base station, the interference includes both background noise as well as total received power from the transmitting mobiles. The more mobile users transmitting, the more interference, and the higher the uplink load is in that base station's cell. Interference at the base station is caused both by transmitting mobiles located in that base station cell as well as transmitting mobiles located in other cells, particularly nearby cells. Unfortunately, it is difficult to determine for one cell the impact that an uplink mobile transmission will have in the one cell, particularly if that mobile is not served by the base station in that cell, and instead, is served by another nearby base station. Nevertheless, that mobile's uplink transmission will still have an adverse impact in the one cell.

Determining the impact that the mobile's transmission will have on another cell is particularly problematic in decentralized or distributed resource management schemes. Distributed resource control is desirable because it is implemented much "closer" to where the resources are actually used. Centralized control schemes also require substantial signaling overhead and impose delays associated with sending information to the central control entity, e.g., a base station controller, a radio network controller, or even a core network node. Significant delay and signaling are associated with the central control entity sending commands and information to the base stations and mobile stations. As high speed downlink and uplink transmission formats become more common, resource management will likely become more decentralized or distributed in order to achieve higher speeds and avoid the considerable signaling (and associated costs) required for centralized control.

Centralized resource management receives information from various cells which allows informing base stations about mobile connections, conditions, etc., in adjacent cells. By its very nature, a distributed resource manager in a base station does not have information about other mobile connections it is not supervising/serving. On the other hand, uplink transmissions from such unserved mobiles can have a dramatic impact the interference in the cell load. For example, a high power or high data rate uplink transmission from a mobile station that is being managed by a first base station in a first cell may create significant interference in a nearby second cell managed by a second base station. That interference increases the load in the second cell and effectively consumes resources in the second cell that the second base station would rather use to service mobiles within the second cell. The second base station has no way of knowing or estimating the impact that other mobile uplink transmissions will have on its resources or how it will impact current communications being supported in the second cell. The first base station does not know, nor can it reasonably estimate, the contribution its served mobiles' transmissions make to the interference at the second base station.

It would be desirable to implement a distributed resource management scheme but at the same time at least reduce the adverse impact of uplink transmissions on adjacent cells. The inventors recognized that these goals could be well achieved using relative path gain related measurements made (directly or indirectly) by the mobiles to improve uplink resource management in a distributed resource control cellular system. For purposes here, a distributed resource control system is one in which the base station alone or in combination with a mobile station makes at least some resource management decisions without having to involve a central controller like a BSC, RNC, core network node, etc. This is also the situation in ad-hoc networking, where access points manage the resources in a distributed fashion. But the relative path gain related measurements can also be valuable for centralized uplink resource control with limited control signaling, where only the most informative measurements should be signaled to the resource control node.

Also, for purposes of this description, path gain encompasses attenuation (attenuation is expressed as a negative number and path gain a positive number in logarithmic scale—attenuation is less than one and path gain greater than one in linear scale) and any other term describing a similar effect on a radio signal. In most of the following text, the path gain related quantity will be represented by path gain itself for clarity. Any other path gain related quantity could also be used. Advantageously, mobiles in many commercial cellular systems already determine path gain values (or values from which path gain can be calculated) relating to pilot signals received from nearby base stations, e.g. for handover purposes. Assuming a logarithmic scale, path gain is typically determined based on a difference between a detected base station pilot signal strength detected at the mobile radio and a pilot signal strength at which the base station transmitted the pilot signal.

The inventive technology may advantageously be used in a cellular radio communication system using distributed resource control that includes a serving cell and a non-serving cell. A mobile radio is currently served by a serving base station in the serving cell. A serving cell corresponds to the cell having the highest path gain to the mobile radio and is very often the cell in which the mobile radio is currently located. A relative path gain is determined for an uplink signal transmission from the mobile radio. The relative path gain is based on a comparison of a first path gain for an uplink signal transmission from the mobile radio to the non-serving base station with a second path gain for the uplink signal transmission from the mobile to the serving base station. Relative path gain can be expressed as a ratio of the second path gain to the first path gain if the path gains are in linear units or as a difference between the second path gain and the first path gain if the path gains are in logarithmic units. Preferably, the relative path gain is an average relative path gain.

Uplink resources in the first cell are managed based on the relative path gain. For example, a transmission power or a data rate used by the mobile radio for the uplink signal transmission may be adjusted. Such adjusting may be based on a previously-determined value provided by the serving base station. One example might be a maximum relative path gain, a maximum signal-to-interference ratio, a maximum data rate, a maximum transmission power, etc.

In one non-limiting example implementation of distributed uplink resource control, the mobile radio determines the relative path gain for uplink signal transmissions from the mobile radio. The mobile radio also manages uplink resources by adjusting a transmission power used by the mobile radio or by adjusting a data rate used by the mobile radio for the uplink signal transmission. More specifically, the mobile radio compares the relative path gain to a predetermined value provided by the serving base station, and if the relative path gain exceeds the predetermined value, the mobile radio adjusts the resources used for the uplink signal transmission.

In another non-limiting example implementation of distributed uplink resource control, the serving base station determines the relative path gain for uplink signal transmissions from the mobile radio, and based on that relative path gain, manages uplink resources. For example, the serving base station compares the relative path gain to a predetermined value. If the relative path gain exceeds the predetermined value, the serving base station instructs the mobile radio to decrease the resources used for the uplink signal transmission.

Various relative path gain measurement reporting methods may be used. For example, the mobile radio may send a relative path gain measurement to the serving base station when the relative path gain measurement exceeds a predetermined value either absolutely or using a hysteresis. Periodic reporting may also be used.

Another application manages uplink resources using a mobile classification based on relative path gain. When a path gain measurement exceeds a predetermined value for one of the mobile radios, that one mobile radio is classified as harmful. Otherwise, the one mobile radio is classified as harmless. Fewer resources are allocated to a harmful mobile radio than to a harmless radio.

Of course, the technology may be applied to situations that involve more than two cells. For example, the cellular radio communication system includes multiple non-serving cells. The relative path gain is then determined based on a comparison of a maximum path gain for an uplink signal transmission from the mobile radio to any of the non-serving base stations with the path gain for the uplink signal transmission from the mobile to the serving base station.

A relative path gain measurement also may include (a) the relation (relation means ratio in linear scale and difference in logarithmic scale) between the received pilot signal power from a non-serving cell and the received pilot signal power from the serving cell or (b) the relation between the received pilot signal power from a non-serving cell relative the interference power and the received pilot signal power from the serving cell relative the interference power. Consequently, in a 3GPP non-limiting example application, relative measurements may be reported for one of the three quantities that may be specified by path gain: common pilot received signal code power, common pilot received signal power, and relative interference power.

BRIEF DESCRIPTION OF THE DRAWINGS

FIG. 1 illustrates a cellular communications system showing different interfering effects of two mobile radios at different locations in a serving cell transmitting at the same power or data rate;

FIG. 2 is a flow chart illustrating example procedures for managing uplink resources using relative path gain;

DETAILED DESCRIPTION

Figure 3:
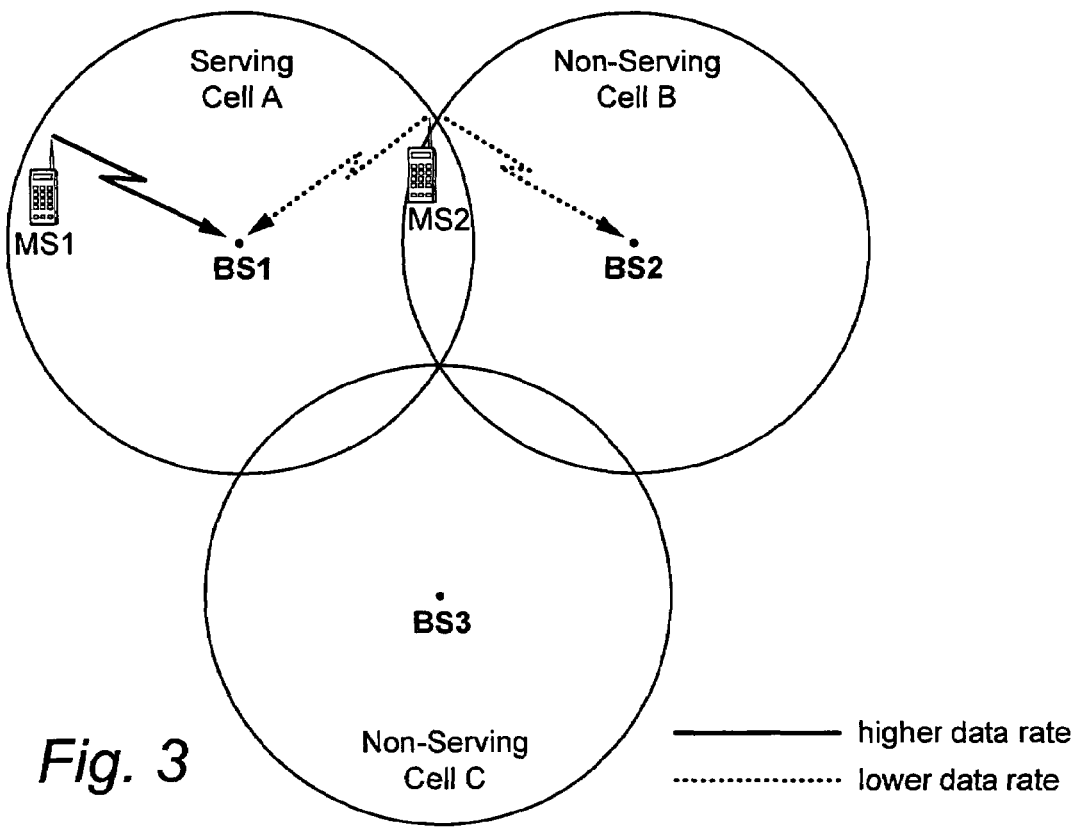
FIG. 3 illustrates a cellular communications system showing a reduced transmission power or data rate for the more interfering mobile radio.

In the following description, for purposes of explanation and non-limitation, specific details are set forth, such as particular nodes, functional entities, techniques, protocols, standards, etc. in order to provide an understanding of the described technology. It will apparent to one skilled in the art that other embodiments may be practiced apart from the specific details disclosed below. And the technology is applicable to any type of cellular radio communications system. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs).

FIG. 1 illustrates a cellular communications system showing different interfering effects of two mobile radios at different locations in a serving cell transmitting at the same power or data rate. Serving cell A with serving base station BS1 serves two mobile radios MS1 and MS2. Both mobile radios are located about the same distance from base station BS1, and both are transmitting in the uplink at the same data rate. To simplify the example, it is assumed that there is no inter-cell interference in serving cell A, and that the uplink path gains from mobile radios MS1 ($g_{11}$) and MS2 ($g_{21}$) to base station BS1 are the same. The mobile radio MS1 has a path gain $g_{12}$ to non-serving base station BS2 and a path gain $g_{13}$ to non-serving base station BS3. The mobile radio MS2 has a path gain $g_{23}$ to non-serving base station BS3.

Because the mobile radios MS1 and MS2 are much further away from base station BS3, as compared to base station BS1, their path gains $g_{13}$ and $g_{23}$ are much lower than $g_{11}$. In other words, their interfering affects in non-serving cell C are minimal. The same is true for MS1's path gain $g_{12}$ to base station BS2. But the same is not true for MS2's path gain $g_{22}$ to non-serving base station BS2, which is the same high level as in the serving cell A. As a result, MS2's uplink transmissions at the current data rate have a significant interfering impact on the communications, the resources, the performance, and the admission capability in non-serving cell B.

The uplink load of a cell is related to the received total wideband power I over thermal noise N at the base station antenna, which is also known as the noise rise. Uplink relative load L is defined through the pole equation:

$$\frac{I}{N} = \frac{1}{1-L} \quad (1)$$

For simplicity, consider a system with a maximum active handover set size 1. Then the total received interference I of any base station j is given by:

$$I_j = \sum_i p_i g_{ij} + N_j \quad (2)$$

where, $p_i$ is the uplink transmit power of mobile radio i, $g_{ij}$ is the path gain for that uplink transmission from mobile i to base station j. The sum is over i in equation (2) meaning over all mobiles transmitting in the network including those mobiles served by non-serving base stations. Mobile i is connected to base station $k_i$, and the uplink transmission from the mobile i is perceived with the carrier-to-total interference $\beta_i$ at the serving base station $k_i$. $\beta_i$ is given by:

$$\beta_i = \frac{p_i g_{ik_i}}{I_{k_i}}. \quad (3)$$

With simple models, the data rate $R_i$ of mobile i is a function of $\beta_i$, i.e., $R_i = f(\beta_i)$. Combining equations (2) and (3) yields:

$$I_j = \sum_i \frac{\beta_i I_{k_i}}{g_{k_i}} g_{ij} + N_j \quad (4)$$

Assuming that the received total wideband power I is equal in all cells and solving equation (4) for $I_j/N_j$ gives:

$$\frac{I_j}{N_j} = \frac{1}{1 - \sum_i \frac{g_{ij}}{g_{k_i}} \beta_i} \quad (5)$$

The resemblance to equation (1) motivates the load approximation of cell j as follows:

$$L_j = \sum_i \beta_i \frac{g_{ij}}{g_{ik_i}} \quad (6)$$

Equation (6) means that the load contribution from mobile radio i to the load in cell j depends on the path gain to the base station j and the serving base stations $k_i$ as well as the allocated service quality closely related to $\beta_i$.

Consider the following numerical example. Assume that the uplink resource management aims at maintaining a noise rise of 7 dB, which via equation (1) corresponds to a relative load L=0.8. Since cell A is subject to no inter-cell interference, the two mobiles may share this entire resource, and since the path gain to the serving cell is equal for the two mobiles, it would natural in a distributed setting to share this resource equally. The relative load of BS1 is given by:

$$L_1 = \beta_1 + \beta_2$$

which gives the uplink resource allocation when not considering relative path gain measurements, i.e., $\beta_1 = \beta_2 = 0.4$. Assume that the non-serving cell path gains are $g_{12} = g_{11}/100$ (relatively low) and $g_{22} = g_{11}/2$ (relatively high). Furthermore, the respective relative load contributions to BS2 from the two mobiles are given by:

$\beta_1/100 = 0.004$ from mobile 1

$\beta_2/2 = 0.200$ from mobile 2

Such a resource allocation of thus uses up a significant portion (about 25%) of the resources at BS2.

More detail regarding uplink relative load approximation is disclosed in Gunnarsson, F., Geijer-Lundin, E., Wiberg, N. and Bark, G. *Admission Control in WCDMA Based on Relative Load Estimates*, In Proc. ICC, May 2002, New York, N.Y., USA.; Geijer-Lundin, E., Gunnarsson, F. and Gustafsson, F. *Uplink Load Estimation in WCDMA*, In Proc. WCNC, March 2003, New Orleans, La., USA; and commonly-assigned U.S. patent application Ser. No. 10/419,270, entitled "Uplink Load Determination And Signaling For Admission And Congestion Control," filed on Apr. 21, 2003. The disclosures of these documents are incorporated here by reference.

FIG. 2 is a flow chart illustrating example procedures for managing uplink resources using relative path gain that overcomes this problem and similar interference problems in non-serving cells. These procedures are particularly useful in a distributed uplink resource management context because they do not rely on a centralized manager knowing the interference impact of mobile radio uplink transmissions in non-serving cells. But they are also quite useful in a centralized uplink resource management. A relative path gain is determined for uplink signal transmissions from the mobile radio (step S1). Relative path gain is based on a comparison of a first path gain for an uplink signal transmission from the mobile radio to a non-serving base station with a second path gain for the uplink signal transmission from the mobile to the serving base station. Relative path gain can be expressed as a ratio of the second path gain to the first path gain, if the path gains are in linear units, or a difference between the second path gain and the first path gain if the path gains are in logarithmic units.

The technology may be applied to situations that involve more than two cells so that there are multiple non-serving cells for the mobile radio. The relative path gain is then determined based on a comparison of a maximum path gain for an uplink signal transmission from the mobile radio to any of the non-serving base stations with the path gain for the uplink signal transmission from the mobile to the serving base station. Preferably, the relative path gain is averaged (step S2) to avoid widely varying gain values that may result from fast fading, for example. Uplink resources are managed using relative path gain, which is particularly advantageous in a distributed uplink resource management configuration (step S3). As already indicated above, resource management encompasses load control, admission control, and resource control.

One example way to manage uplink resources based on relative path gain measurements is to relate or limit the resource allocation of a mobile to the reported measurements. Returning now to the previous FIG. 1 example, now in the context of FIG. 3, the relative gain for the mobile radio MS1 is much lower than the relative path gain of mobile radio MS2, which means that much less resources are allocated to MS2 than to MS1. So its uplink data rate is not reduced. In contrast, the relative gain for the mobile radio MS2 exceeds the limit, so its uplink data rate is reduced, thereby reducing the interfering impact on non-serving cell B.

Using the previous numerical example, the two mobiles could be allocated resources according to $\beta_1=0.7$ and $\beta_2=0.1$, which still meets the relative load requirement of L=0.8, even though the resources are unevenly allocated to the two mobiles. Then the respective relative load contributions to BS2 from the two mobiles are given by:

$\beta_1/100=0.007$ from mobile 1

$\beta_2/2=0.050$ from mobile 2 which means that much less of the resources (about 7%) at BS2 are used up than when allocating the resources evenly to the two mobiles (about 25%).

Figure 4:
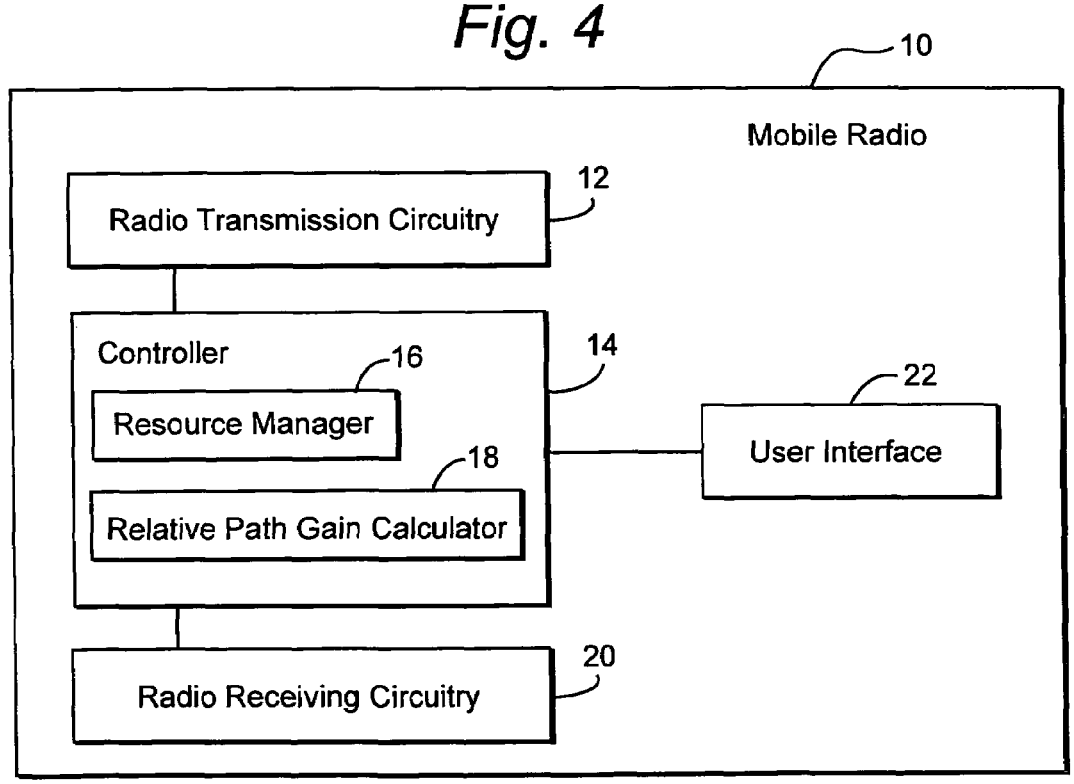
FIG. 4 illustrates a function block diagram of a mobile station that may be used in a first, non-limiting, example embodiment for managing uplink resources using relative path gain.

FIG. 4 illustrates a function block diagram of a mobile station that may be used in a first, non-limiting, example embodiment for managing uplink resources using relative path gain in a distributed or decentralized uplink resource management context. Mobile radio 10 includes radio transmission circuitry 12 and radio receiving circuitry 20 coupled to a controller 14. The controller 14 is also coupled to a user interface 22 (coupled to a speaker, microphone, keypad, touchpad, or display, etc.) for communication with a user. Each base station transmits a pilot signal or other downlink signal that includes the transmission power at which it was transmitted by its base station.

The radio receiving circuitry 20 receives base station pilot signals that are within range and provides them to a relative path gain calculator 18. Uplink relative path gains are determined using downlink path gain values and making the assumption that the uplink path gain is approximately the same as the downlink path gain. The relative path gain calculator 18 determines an uplink path gain for each base station may be determined by subtracting the received signal strength of its own pilot signal from that pilot signal's actual transmission power in logarithmic power units. Alternatively, the path gain uplink path gain to each base station may be determined by dividing the received pilot signal strength by its actual transmission power in linear power units. An example implementation for relative path gain calculator 18 is described below in conjunction with FIG. 5.

The controller 14 further includes a resource manager 16 that manages uplink resources based on path gain. For example, the mobile radio compares the relative path gain to a predetermined value provided by the serving base station. If the relative path gain exceeds the predetermined value, the mobile radio decreases the resources (e.g., power, data rate, etc.) used for the uplink signal transmission.

Continuing with the numerical example from above, assume again that the base station BS1 allocates the resources evenly, $\beta_1=\beta_2=0.4$. Assume also that the mobiles must fulfill a condition based on a relative path gain measurement and a predefined value $\alpha$:

$f$(max non-serving cell path gain/serving cell path gain)$\leq\alpha$.

For example, the condition motivated by the relative load approximation is as follows:

(max gain for the non serving cell/the gain of the serving cell)$\leq\alpha$.

If $\alpha=0.05$, then mobile 1 is not restricted because:

$g_{12}/g_{11}(\beta_1)=1/100*0.4=0.004<0.1$

However, mobile 2 is restricted because:

$g_{22}/g_{11}(\beta_2)=1/2*0.4=0.2>0.1$

The $\beta$ (i.e., roughly corresponding to the data rate) may then be adjusted so the a condition is met, which is possible with making an adjustment so that $\beta=0.1$. Then the respective relative load contributions to BS2 from the two mobiles are given by:

$\beta_1/100=0.004$ from mobile 1

$\beta_2/2=0.050$ from mobile 2 which means that much less of the resources at BS2 (less than 7%) are used up than when allocating the resources evenly from above (about 25%). This restriction limits the resource utilization of BS 1, since:

$L1=\beta_1+\beta_2=0.45$.

This is something the base station BS1 may handle by gradually increasing the allocated data rate to the two mobiles, which is acceptable since mobile 2 is already limited by the $\alpha$ condition.

Figure 5:
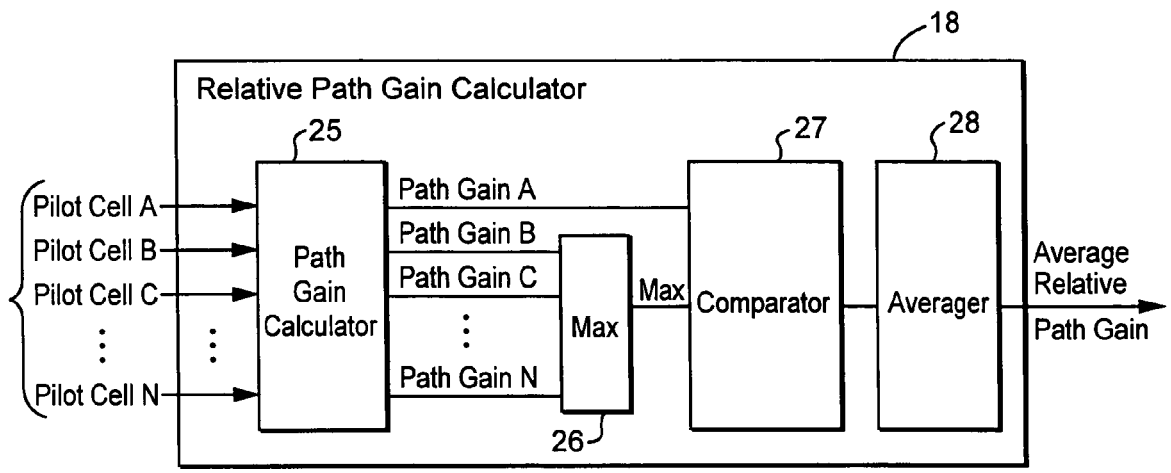
FIG. 5 is a function block diagram of an example relative path gain calculator that may be used in the mobile station.

FIG. 5 is a function block diagram of an example relative path gain calculator 18 that may be used in the mobile radio 10. A path gain calculator 25 receives pilot signals from cells A, B, C, ..., N. Assuming linear units, the path gain calculator 25 subtracts the received signal strength of each pilot signal from the pilot signal's actual transmission power. A maximum value selector 26 selects from the non-serving cell path gains B, C, ..., N, the maximum path gain. A comparator 27 compares the maximum non-serving path gain with the path gain A for the serving cell. The comparison can be a difference for linear units or a ratio of the maximum non-serving cell path gain to the serving cell path gain for logarithmic units, the relative path gain is preferably averaged in averager 28 to avoid rapid, short lived values that are caused by fast fading and other short term radio channel effects. The average path gain is then forwarded to the resource manager 16.

Figure 6:
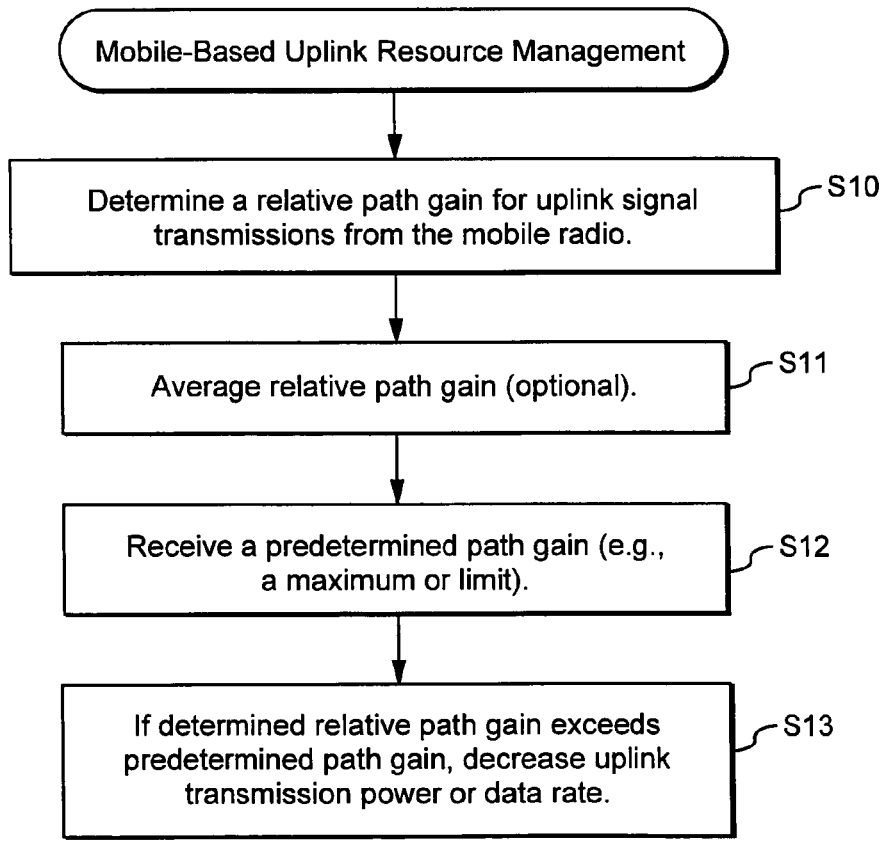
FIG. 6 is a flow chart diagram illustrating example steps for mobile-based uplink resource management.

FIG. 6 is a flow chart diagram illustrating example steps for mobile-based uplink resource management. A relative path gain is determined for uplink signal transmissions from the mobile radio based on downlink path gain values (step S10). Preferably, the relative path gain is averaged to avoid widely and rapidly varying gain values (step S11). A predetermined relative path gain value (e.g., a maximum or a limit) is received from the serving base station (or from some other source) (step S12). If the determined relative path gain exceeds the predetermined relative path gain or a predetermined relative path gain plus a hysteresis, the controller 14 instructs a decrease in the uplink transmission power or the uplink data transmission rate (step S13) to reduce the interference effects of the mobile's uplink transmission in one or more non-serving cells. If the determined relative path gain is less than a predetermined relative path gain or a predetermined relative path gain minus a hysteresis, the controller 14 may instruct an increase in the uplink transmission power or the uplink data transmission rate (step S13) if requested by the mobile radio since there will not be a significant inference impact of the mobile's uplink transmission on one or more non-serving cells. Of course, other factors may be considered in determining whether to increase or decrease the power/data rate.

Figure 7:
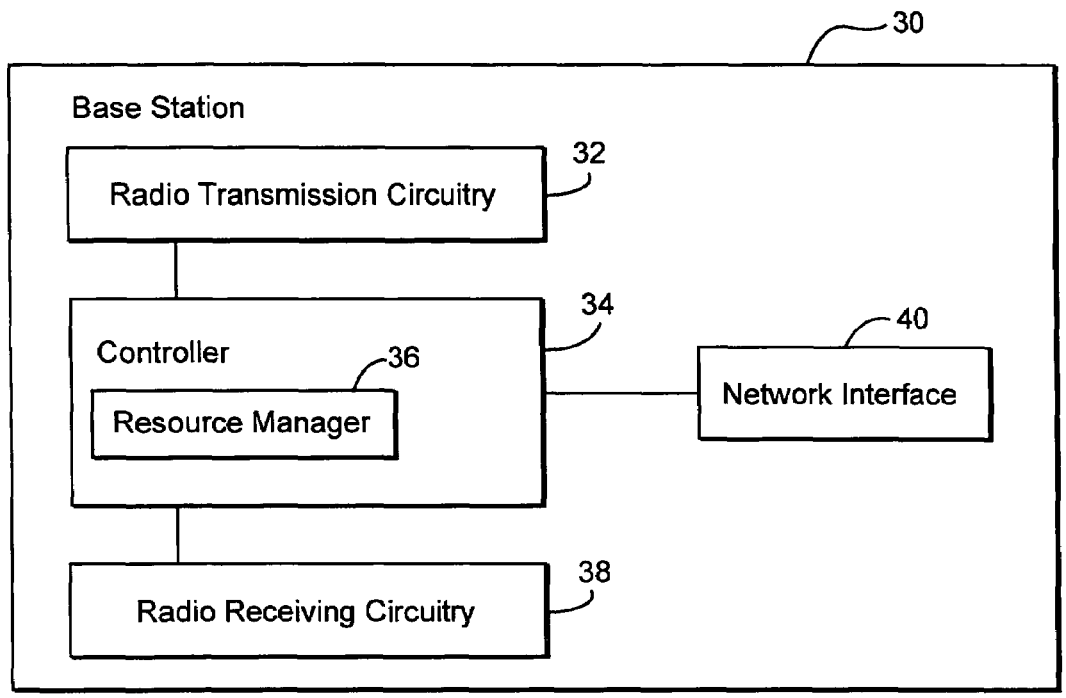
FIG. 7 a function block diagram of a base station that may be used in a second, non-limiting, example embodiment for managing uplink resources using relative path gain.

FIG. 7 a function block diagram of a base station 30 that may be used in a second, non-limiting, example distributed embodiment for managing uplink resources using relative path gain. The base station 30 includes radio transmission circuitry 32 and radio receiving circuitry 38 coupled to a controller 34. The controller 34 is also coupled to a network interface 40 for communication with the rest of the radio network. The controller includes a resource manager 36 that receives relative path gain data or relative path gain measurement data from which relative path gain can be calculated. The resource manager 36 manages uplink resources using relative path gain. For example, it compares the relative path gain to a predetermined value, and if the relative path gain exceeds the predetermined value, the controller issues an instruction to the mobile radio to decrease its use of resources (e.g., power, data rate, etc.) for the uplink signal transmission.

Figure 8:
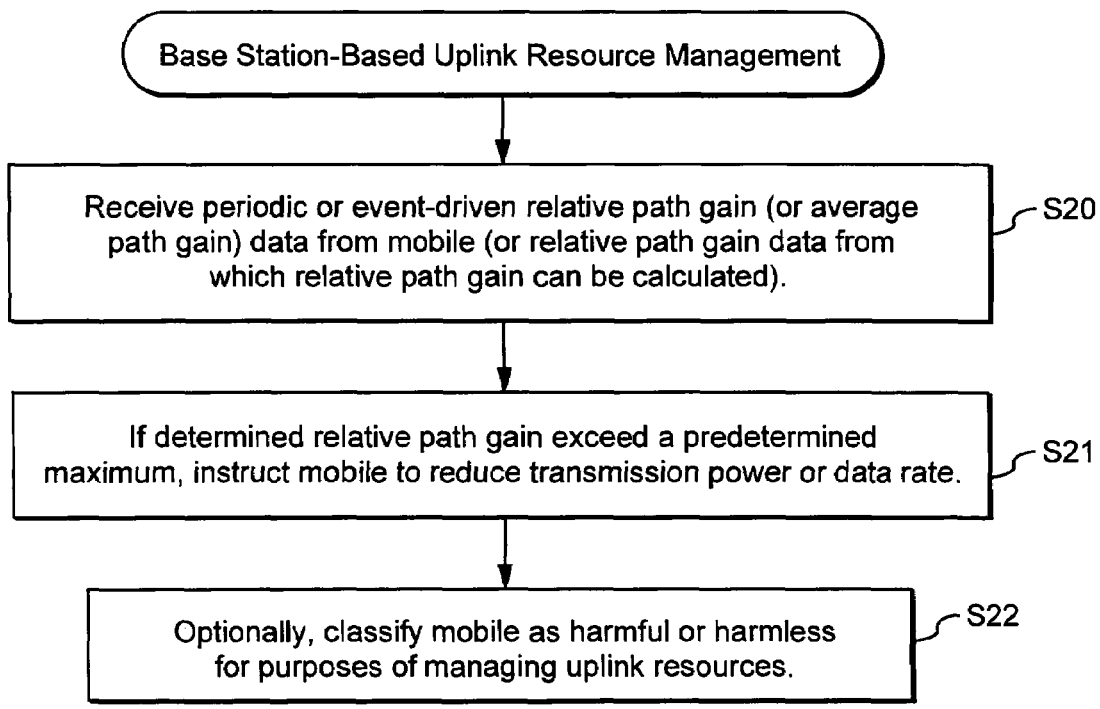
FIG. 8 is a flow chart diagram illustrating example steps for base station-based uplink resource management.

FIG. 8 is a flow chart diagram illustrating example steps for base station-based uplink resource management. The base station receives relative path gain (or average path gain) data from the mobile radio (or relative path gain data from which relative path gain can be calculated) (step S20). Various path gain measurement reporting methods may be used. For example, the mobile radio may send a path gain measurement to the serving base station when the path gain measurement exceeds a predetermined value, either absolutely or using a hysteresis. Two measurement reporting triggers could be used: when the relative path gain exceeds a threshold+a hysteresis and when the relative path gain dips below a threshold+a hysteresis. In the latter case, the base station could instruct the mobile to increase its use of resources, e.g., transmission power, data rate, etc. Periodic reporting may also be used. If the determined relative path gain exceeds a predetermined maximum, the mobile station may be instructed to reduce transmission power or data rate (step S21).

Optionally, the base station may classify the mobile radio as harmful or harmless based on relative path gain for purposes of managing uplink resources (step S22). When a path gain measurement exceeds a predetermined value (with or without a hysteresis) for a mobile radio, that mobile radio is classified as harmful. Otherwise, the mobile radio is classified as harmless. Some of all transmitting mobiles are classified accordingly. Fewer resources are allocated to a harmful mobile radio than to a harmless radio. For example, only harmless mobile radios may be assigned a very high uplink bit rate, and harmful mobiles are only allocated a data rate corresponding to $\beta=0.1$ to handle worst case mobiles on the cell border in situation like mobile 2 in the numerical example.

The text above describes relative path gain measurements for clarity, but a person skilled in the art realizes that the same applies for other path gain related measurements. One example includes received signal power level from a signal with a known signature, such as a pilot signal. In 3GPP, this measurement is denoted Common Pilot Channel (CPICH) received signal code power (RSCP). Another example includes the ratio between a received signal power level from a signal with a known signature and the interference power. In 3GPP, this measurement is denoted CPICH $E_c/I_o$.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. No claim is intended to invoke paragraph 6 of 35 USC §112 unless the words "means for" are used.

The invention claimed is:

1. A method for use in a cellular radio communication system that includes a first cell and a second cell, where a mobile radio is currently served by a first base station in the first cell, comprising:
    (a) the mobile radio generating a relative path gain related quantity for an uplink signal transmission from the mobile radio, where the relative path gain related quantity is based on a comparison of a first path gain related quantity for an uplink signal transmission from the mobile radio to the second base station with a second path gain related quantity for the uplink signal transmission from the mobile to the first base station, and
    (b) controlling uplink resources from the mobile radio in the first cell based on the relative path gain related quantity.

2. The method in claim 1, wherein the path gain related quantity is one of the following: a path gain measurement, a received signal power, a received signal code power (RSCP), a common pilot channel (CPICH) received signal code power (RSCP), a received signal power relative interference power, or a common pilot channel (CPICH) received signal power relative interference power.

3. The method in claim 1, wherein uplink resource control is distributed to the first base station, the mobile station, or both.

4. The method in claim 1, wherein relative path gain quantity is a ratio of the second path gain quantity to the first path gain quantity if the path gain quantities are in linear units or a difference between the second path gain quantity and the first path gain quantity if the path gain quantities are in logarithmic units.

5. The method in claim 1, wherein managing uplink resources includes adjusting a transmission power or a data rate used by the mobile radio for the uplink signal transmission.

6. The method in claim 5, wherein the adjusting depends on a previously-determined value provided by the first base station.

7. The method in claim 1, wherein the mobile radio compares the relative path gain related quantity to a predetermined value provided by the base station, and if the relative path gain related quantity exceeds the predetermined value, the mobile radio adjusts the resources used for the uplink signal transmission.

8. The method in claim 1, wherein the path gain is determined based on a difference between a detected base station pilot signal strength detected at the mobile radio and a pilot signal strength at which the base station transmitted the pilot signal.

9. The method in claim 1, wherein the relative path gain related quantity is an average relative path gain related quantity.

10. The method in claim 1, wherein the mobile radio sends a relative path gain related quantity to the first base station when the relative path gain quantity exceeds a predetermined value.

11. The method in claim 10 as applied to multiple mobile radios being served by the first cell, further comprising:
when a relative path gain related quantity exceeds a predetermined value for one of the mobile radios, classifying the one mobile radio as harmful, and otherwise classifying the one mobile radio as harmless,
wherein fewer resources are allocated to a harmful mobile radio than to a harmless radio.

12. The method in claim 1, wherein the cellular radio communication system includes a third cell with the second and third cell being non-serving cells for the mobile radio, and wherein the relative path gain related quantity is determined based on a comparison of a maximum path gain related quantity for an uplink signal transmission from the mobile radio to either of the non-serving base stations with the path gain related quantity for the uplink signal transmission from the mobile to the second base station.

13. Apparatus in a mobile radio comprising:
electronic circuitry configured to calculate a relative path gain related quantity for an uplink signal transmission from the mobile radio, where the relative path gain related quantity is based on a comparison of a first path gain related quantity for an uplink signal transmission from the mobile radio to a first base station with a second path gain related quantity for the uplink signal transmission from the mobile to a second base station, and
an uplink resource controller configured to adjust uplink transmission from the mobile radio based on the relative path gain related quantity.

14. The mobile radio apparatus in claim 13, wherein relative path gain related quantity is a ratio of the first path gain related quantity to the second path gain related quantity if the path gain related quantities are in linear units or a difference between the first path gain related quantity and the second path gain related quantity if the path gain related quantities are in logarithmic units.

15. The mobile radio apparatus in claim 13, wherein the uplink resource controller is configured to adjust a transmission power or a data rate used by the mobile radio for the uplink signal transmission.

16. The mobile radio apparatus in claim 15, wherein the uplink resource controller is configured to determine the adjustment depending on a previously-determined value provided by the second base station.

17. The mobile radio apparatus in claim 13, wherein the electronic circuitry is configured to compare the relative path gain related quantity to a predetermined value provided by the base station, and if the relative path gain related quantity exceeds the predetermined value, the electronic circuitry is configured to adjust the resources used for the uplink signal transmission.

18. The mobile radio apparatus in claim 13, wherein uplink resource control is distributed to the first base station.

* * * * *